United States Patent [19]

Nakano et al.

[11] 3,916,847

[45] Nov. 4, 1975

[54] INTAKE AND EXHAUST SYSTEM FOR THREE VALVE INTERNAL COMBUSTION ENGINE

[75] Inventors: Soichi Nakano, Kawagoe; Eiji Taguchi, Tokyo; Yoshitoku Iizuka, Toda, all of Japan

[73] Assignee: Honda Giken Kogyo Kabushiki Kaisha, Tokyo, Japan

[22] Filed: June 27, 1973

[21] Appl. No.: 374,082

[30] Foreign Application Priority Data

June 28, 1972 Japan .................... 47-64667

[52] U.S. Cl. ........ 123/32 SP; 123/75 B; 123/122 A; 123/122 AB; 165/52
[51] Int. Cl. ....................... F02b 19/10; F02b 19/18
[58] Field of Search ..... 123/122 A, 122 AC, 32 ST, 123/32 SP, 52 M, 75 B, 122 AB; 165/52

[56] References Cited
UNITED STATES PATENTS

| | | | |
|---|---|---|---|
| 1,342,159 | 6/1920 | Champaign | 123/122 |
| 1,600,007 | 9/1926 | Mock | 123/122 |
| 1,670,550 | 5/1928 | Putnam | 123/122 |
| 1,744,319 | 1/1930 | Link | 123/122 |
| 2,232,413 | 2/1941 | Steskal | 123/122 |
| 2,821,182 | 1/1958 | Kennedy | 123/122 |
| 2,836,161 | 5/1958 | Primakoff | 123/122 |
| 3,092,088 | 6/1963 | Goosbak | 123/32 ST |
| 3,659,564 | 5/1972 | Suzuki | 123/32 ST |
| 3,741,180 | 6/1973 | Eichbaum | 123/122 |
| 3,780,715 | 12/1973 | Flitz | 123/122 |

*Primary Examiner*—Charles J. Myhre
*Assistant Examiner*—Ronald B. Cox
*Attorney, Agent, or Firm*—Lyon & Lyon

[57] ABSTRACT

A three valve internal combustion engine has an auxiliary combustion chamber connected to a main combustion chamber through a torch opening, and a spark plug ignites a rich combustible mixture in the auxiliary chamber to project a flame through the torch opening to ignite a relatively lean mixture in the main combustion chamber. To prevent condensation of fuel in the intake passage to the auxiliary combustion chamber, especially under start-up conditions, the rich combustible mixture is passed in heat exchange relationship with exhaust gasses from the main combustion chamber. Thin wall metallic conduits carrying the rich combustible mixture to the auxiliary chamber and carrying exhaust gasses from the main chamber are placed in integral contact and are enclosed within a relatively thick wall protective shell.

5 Claims, 1 Drawing Figure

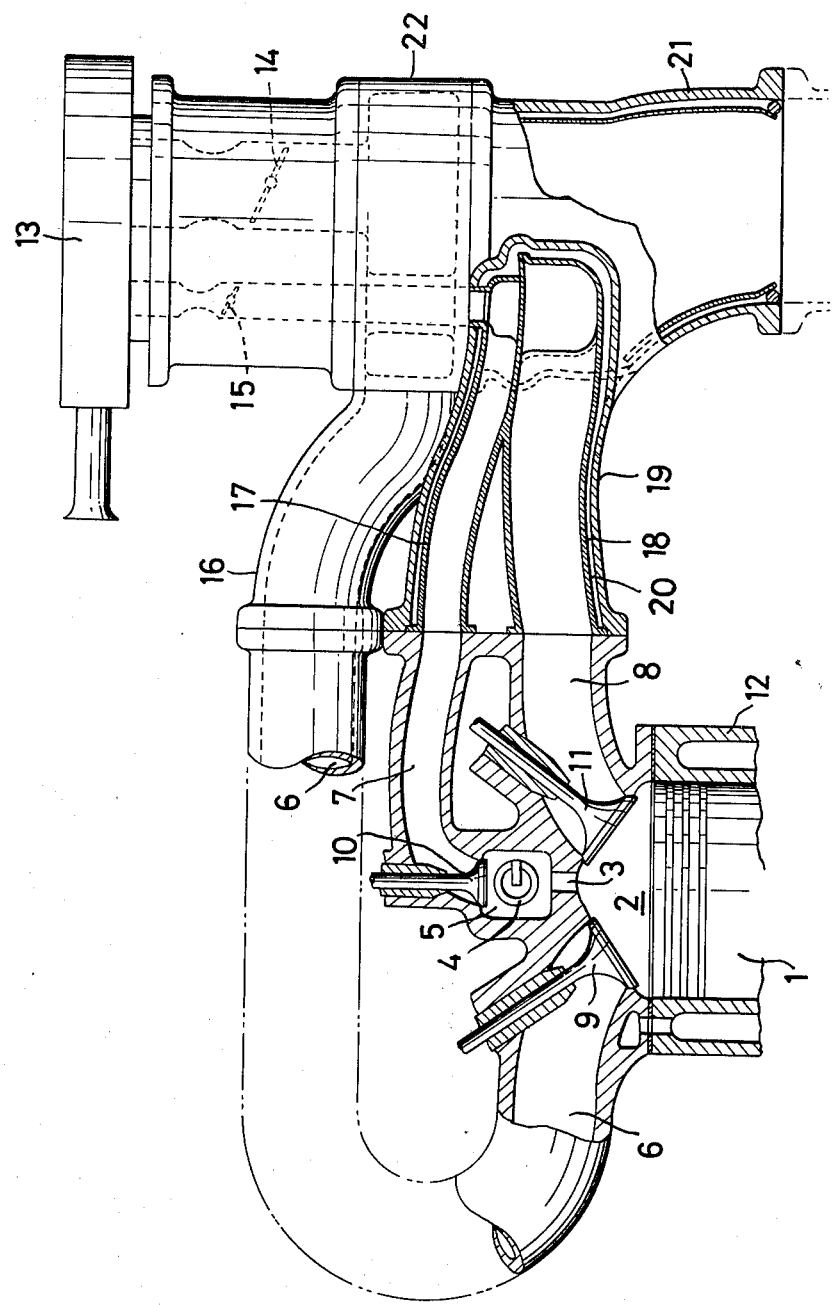

INTAKE AND EXHAUST SYSTEM FOR THREE VALVE INTERNAL COMBUSTION ENGINE

This invention relates to internal combustion engines and is particularly directed to improvements in a three valve engine having a main combustion chamber and an auxiliary combustion chamber connected by a torch opening. A rich combustible mixture delivered to the auxiliary chamber is ignited by a spark plug and the resulting flame is projected through the torch opening to ignite a relatively lean mixture in the main combustion chamber.

Such a three valve engine is subject to difficulties under cold start-up conditions and sometimes during normal operation because the fuel in the rich mixture delivered to the auxiliary chamber tends to condense on the walls of the intake passage, resulting in waste of fuel and unwanted presence of unburned hydrocarbons in the exhaust passages leading to atmosphere. In accordance with this invention, these difficulties are overcome by providing a novel form of heat exchange apparatus for heating the relatively rich mixture in the intake passage to the auxiliary chamber by the heat of the exhaust gasses. The novel structure includes a thin wall metallic conduit for the rich combustible mixture and a thin wall conduit for the exhaust gasses, the conduits having an integral connection for heat transfer. A protective shell encompasses both conduits to provide a rigid structure.

The drawing is a side elevation partly broken away showing a preferred embodiment of this invention.

Referring to the drawing, the internal combustion engine has a movable piston 1 defining a movable wall of the main combustion chamber 2. A torch opening 3 extends between the main chamber 2 and the auxiliary combustion chamber 5, the latter being provided with spark plug 4. The intake passage 6 to the main chamber 2 is controlled by intake valve 9, and the intake passage 7 to the auxiliary chamber 5 is controlled by intake valve 10. The exhaust passage 8 from the main combustion chamber 2 is controlled by exhaust valve 11. The three valves 9, 10 and 11 are mounted in the head secured to the main body 12 of the engine.

Air admitted through the air cleaner 13 is mixed with fuel in the main carburetor 14 and in the auxiliary carburetor 15, and the combustible mixtures thus formed pass through the main intake pipe 16 and the auxiliary intake pipe 17. A relatively lean mixture is delivered from carburetor 14 to intake pipe 16, and a relatively rich mixture is delivered from carburetor 15 to intake pipe 17. The spark plug 4 ignites the relatively rich combustible mixture in the auxiliary chamber 5 and causes a flame to project through the torch opening 3 to ignite the relatively lean combustible mixture in the main chamber 2. The exhaust gasses from the main chamber 2 pass through the exhaust passage 8 and exhaust pipe 18. The pipes 17 and 18 comprise thin wall metallic conduits having an integral portion common to both. A relatively thick wall shell 19 encompasses thin wall conduits 17 and 18 to provide a rigid structure. The heat insulating space 20 comprises an air gap which, if desired, may be filled with a heat insulation material.

Exhaust gasses in the passage 8 are carried through the thin wall conduit 18 and into the exhaust manifold 21. Numeral 22 designates apparatus for acceleration of vaporization of gas mixtures.

In operation, the relatively rich combustible mixture delivered from auxiliary carburetor 15 through thin wall conduit 17 is heated by heat exchange relationship with the hot exhaust gasses passing through thin wall conduit 18. Accordingly, the rich combustible mixture in the intake passage 7 is heated sufficiently to avoid condensation of fuel on the walls of the passage, thereby improving combustion in the auxiliary combustion chamber 5 with consequent improvement in fuel economy and in the reduction of the emissions of unburned hydrocarbons through the exhaust passage 8 and exhaust manifold 21.

Having fully described our invention, it is to be understood that we are not to be limited to the details herein set forth but that our invention is of the full scope of the appended claims.

We claim:

1. In an internal combustion engine having valved intake and exhaust passages communicating with a main combustion chamber, and having a valved intake passage communicating with an auxiliary combustion chamber, the chambers communicating through a torch opening, the passages and opening being positioned within a cylinder head of the engine, and a spark plug positioned to ignite a combustible mixture in the auxiliary chamber, the improvement comprising, in combination: means including a first thin wall metallic conduit extending laterally to the cylinder head for supplying a combustible mixture to the valved intake passage to the auxiliary chamber, means including a second thin wall metallic conduit extending laterally from the cylinder head for receiving exhaust gasses from the valved exhaust passage, and means laterally spaced from the cylinder head connecting at least a portion of said thin wall metallic conduits in heat exchange relationship so that the combustible mixture in said first conduit is heated by exhaust gasses in said second conduit, and means including a protective shell of relatively thick walls surrounding and structurally supporting said conduits, and extending for the full lengths thereof.

2. The combination set forth in claim 1 in which at least a portion of said thin wall conduits are joined integrally.

3. In an internal combustion engine having a main combustion chamber provided with a wall thereof defined by a movable piston and having an auxiliary combustion chamber communicating through a torch opening with the main combustion chamber, the main chamber having a valved intake passage and a valved exhaust passage, the auxiliary chamber having a valved intake passage, the passages and opening being positioned within a cylinder head of the engine, and a spark plug associated with the auxiliary chamber, the improvement comprising, in combination: means including a first thin wall metallic conduit extending laterally to the cylinder head for supplying a relatively rich combustible mixture to the valved intake passage to the auxiliary chamber, means including a second thin wall metallic conduit extending laterally from the cylinder head for receiving exhaust gasses from the valved exhaust passage, means including a third conduit for supplying a relatively lean combustible mixture to the valved intake passage to the main chamber, and means laterally spaced from the cylinder head connecting at least a portion of said first and second conduits in heat exchange relationship so that the relatively rich combustible mixture in said first conduit is heated by exhaust gasses in said second conduit, and means including a protective shell of relatively thick walls surrounding and structurally supporting said thin wall conduits, and extending for the full lengths thereof.

4. The combination set forth in claim 3 in which at least a portion of said thin wall conduits are joined integrally.

5. The combination set forth in claim 3 in which said protective shell comprises a rigid cast structure.